US012774215B2

(12) United States Patent
Nabeta et al.

(10) Patent No.: US 12,774,215 B2
(45) Date of Patent: Oct. 27, 2026

(54) CERIUM-BASED COMPLEX OXIDE POWDER, FRICTION MATERIAL COMPOSITION, AND FRICTION MATERIAL

(71) Applicant: DAIICHI KIGENSO KAGAKU KOGYO CO., LTD., Osaka (JP)

(72) Inventors: Takuji Nabeta, Osaka (JP); Motoki Takase, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 572 days.

(21) Appl. No.: 18/547,684

(22) PCT Filed: Jun. 13, 2022

(86) PCT No.: PCT/JP2022/023603

§ 371 (c)(1),
(2) Date: Aug. 23, 2023

(87) PCT Pub. No.: WO2022/264961

PCT Pub. Date: Dec. 22, 2022

(65) Prior Publication Data

US 2024/0133439 A1 Apr. 25, 2024
US 2024/0228313 A9 Jul. 11, 2024

(30) Foreign Application Priority Data

Jun. 14, 2021 (WO) .................. PCT/JP2021/022503

(51) Int. Cl.
*F16D 69/02* (2006.01)
*C01F 17/235* (2020.01)
*C01G 25/00* (2006.01)

(52) U.S. Cl.
CPC .......... *C01F 17/235* (2020.01); *C01G 25/006* (2013.01); *F16D 69/026* (2013.01); *F16D 69/028* (2013.01); *C01P 2002/52* (2013.01); *C01P 2002/60* (2013.01); *C01P 2002/72* (2013.01); *C01P 2004/61* (2013.01); *C01P 2004/62* (2013.01); *C01P 2004/64* (2013.01); *C01P 2006/12* (2013.01); *C01P 2006/21* (2013.01); *F16D 2200/0065* (2013.01)

(58) Field of Classification Search
CPC ................................ F16D 69/02; C01G 25/00
USPC .......................................................... 523/156
See application file for complete search history.

(56) References Cited

U.S. PATENT DOCUMENTS 6,605,565 B1 8/2003 Zhang et al.
6,846,475 B1 1/2005 Taguchi et al.
2008/0318761 A1 12/2008 Riedel et al.
2012/0035046 A1 2/2012 Rosenflanz
2012/0082849 A1 4/2012 Nonnet et al.
2017/0151551 A1 6/2017 Minami et al.
2017/0284491 A1 10/2017 Unno et al.
2022/0396494 A1* 12/2022 Nabeta ...................... C01F 7/02
2023/0321631 A1 10/2023 Zhang et al.
2023/0321632 A1 10/2023 Huang et al.

FOREIGN PATENT DOCUMENTS

CN 1263868 A 8/2000
CN 1537085 A 10/2004
CN 104254393 A 12/2014
CN 106795423 A 5/2017
CN 106807355 A 6/2017
CN 108970602 A 12/2018
CN 111939894 A 11/2020
CN 112076740 A 12/2020
EP 3 181 224 A1 6/2017
EP 3181224 B1 * 2/2022 ............. B01J 35/45
JP H09-013009 A 1/1997
JP 2000-302410 A 10/2000
JP 2004-536771 A 12/2004
JP 2007-022835 A 2/2007
JP 2008-529758 A 8/2008
JP 2012-528782 A 11/2012
JP 2013-049627 A 3/2013
JP 2016-079246 A 5/2016
JP 2017-095336 A 6/2017
KR 10-2017-0066522 A 6/2017
WO 03/011781 A2 2/2003
WO 03/011786 A1 2/2003
WO 2013/092557 A1 6/2013
WO 2016/060129 A1 4/2016
WO WO-2021149498 A1 * 7/2021 ............. F16D 69/02
WO WO-2021225181 A1 * 11/2021 ........... F16D 69/028

OTHER PUBLICATIONS

International Search Report issued in PCT/JP2021/022503; mailed Aug. 10, 2021.
International Search Report issued in PCT/JP2022/023603; mailed Aug. 16, 2022.
Notification of Transmittal of Copies of Translation of the International Preliminary Report on Patentability and Translation of Written Opinion of the International Searching Authority; PCT/JP2022/023603; mailed on Dec. 28, 2023.

(Continued)

*Primary Examiner* — Deve V Hall
(74) *Attorney, Agent, or Firm* — Studebaker Brackett PLLC

(57) ABSTRACT

A complex oxide powder contains cerium and aluminum, and has a specific surface area of 0.5 $m^2/g$ or more and 10 $m^2/g$ or less.

22 Claims, 1 Drawing Sheet

(56) References Cited

OTHER PUBLICATIONS

Notification of Transmittal of Copies of Translation of the International Preliminary Report on Patentability and Translation of Written Opinion of the International Searching Authority; PCT/JP2021/022503; mailed on Dec. 28, 2023.
Office Action issued in CN 202280018621.5; mailed by the State Intellectual Property Office of the People's Republic of China on Oct. 14, 2025.
Xu Runze; "Powder Metallurgy Structural Materials"; Dec. 1998; total 3 pages; Central South University; Changsha, China; ISBN: 1-81061-158-5; English translation of CN Search Report as concise explanation of the relevance.
An Office Action; mailed by the China National Intellectual Property Administration of the People's Republic of China on Apr. 23, 2025, which corresponds to Chinese Patent Application No. 202280018621.5 and is related to U.S. Appl. No. 18/547,684.
An Office Action; "Notice of Reasons for Refusal," mailed by the Japanese Patent Office on Jun. 12, 2024, which corresponds to Japanese Patent Application No. 2023-529854 and is related to U.S. Appl. No. 18/547,684; with English language translation.
Extended European Search Report issued in EP 22 82 4950.4-1014 by the European Patent Office on Mar. 14, 2025, which is related to U.S. Appl. No. 18/547,684.
Office Action issued in KR 10-2023-7026882; mailed by the Korean Intellectual Property Office on Jul. 25, 2025.
"Decision of Rejection" Office Action issued in CN 202280018621.5; mailed by the China National Intellectual Property Administration on Mar. 19, 2026.

* cited by examiner

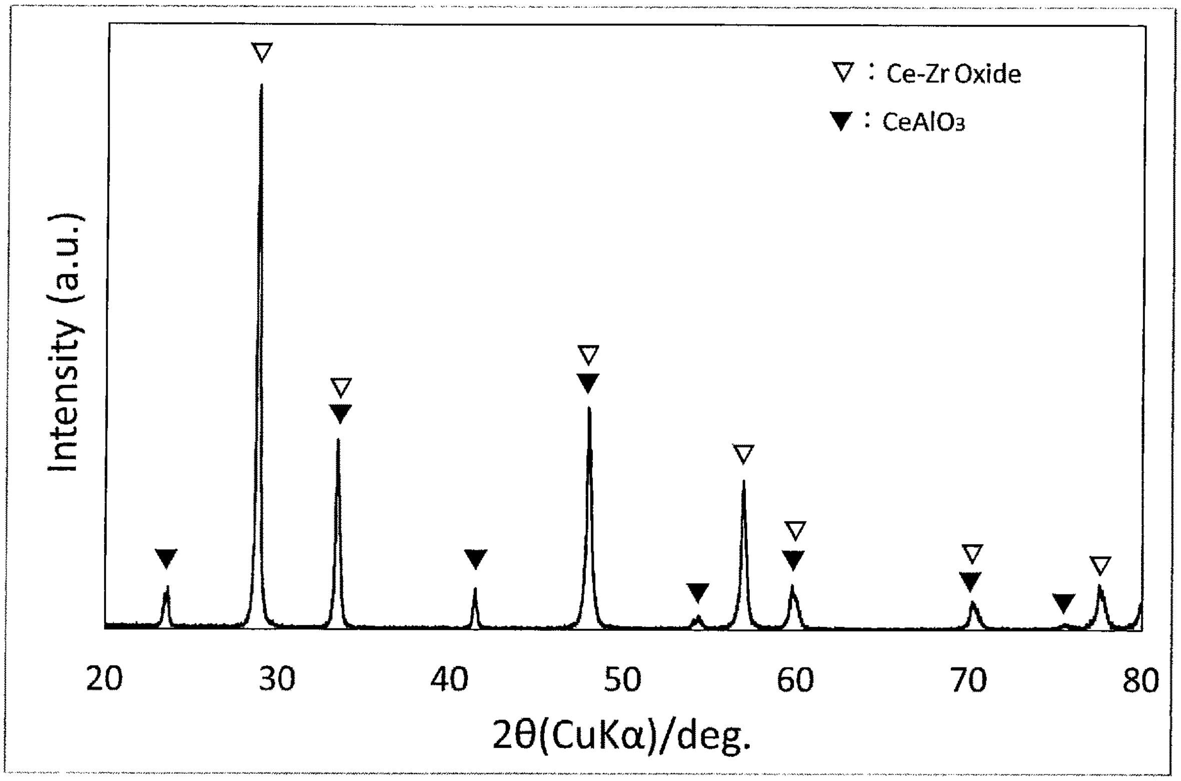
▽ : Ce-Zr Oxide
▼ : $CeAlO_3$
Intensity (a.u.)
20
30
40
50
60
70
80
2θ(CuKα)/deg.

CERIUM-BASED COMPLEX OXIDE POWDER, FRICTION MATERIAL COMPOSITION, AND FRICTION MATERIAL

TECHNICAL FIELD

The present invention relates to a cerium-based complex oxide powder, a friction material composition, and a friction material.

BACKGROUND ART

Brake pads are often used for braking of automobiles and the like. Conventionally, asbestos has been mainly added to the brake pads to obtain desired performance. However, in recent years, asbestos-free brake pads have been required due to the problem of an environmental load, and have been actively researched and developed.

Conventionally, in general, a powder of zircon mineral ore, or a powder of zirconium oxide obtained by removing impurities such as silicon from mineral ore is often used as a friction material used for the brake pad. However, problems such as a recent increase in raw material cost and inclusion of a radioactive element derived from ore occur.

Patent Document 1 discloses a friction material formed by bonding a fiber base material and a friction modifier with a thermosetting resin. The friction material contains a rare earth oxide as at least a part of the friction modifier. Patent Document 1 discloses, as an effect, that rare earth oxides such as $CeO_2$, $La_2O_3$, and $Y_2O_3$ have lower hardness than that of a general abrasive material such as alumina, and are less likely to cause deterioration and the like, whereby the rare earth oxides can reduce the property of attacking a mating material while obtaining a high and stable friction coefficient.

Patent Document 2 discloses a friction material composition containing a binder, an organic filler, an inorganic filler, and a fiber base material. The friction material composition contains no copper as an element. The inorganic filler is one or two or more selected from γ-alumina having an average particle size of 10 nm to 50 μm, dolomite having an average particle size of 1 to 20 μm, calcium carbonate having an average particle size of 1 to 20 μm, magnesium carbonate having an average particle size of 1 to 20 μm, manganese dioxide having an average particle size of 1 to 20 μm, zinc oxide having an average particle size of 10 nm to 1 μm, ferrosoferric oxide having an average particle size of 1.0 μm or less, cerium oxide having an average particle size of 0.5 to 5 μm, and zirconia having an average particle size of 5 to 50 nm. Patent Document 2 discloses, as an effect, that the friction material composition has excellent fade resistance and wear resistance at a high temperature exceeding 500° C. even if copper having a high environmental load is not used when the friction material composition is used for a friction material such as a disc brake pad for automobiles.

Patent Document 3 discloses a friction material composition containing a binder, an organic filler, an inorganic filler, and a fiber base material. The friction material composition contains no copper as an element. The friction material composition contains potassium titanate having a plurality of convex shapes and zirconium silicate having an average particle size of 1 to 2.5 μm. Patent Document 3 discloses, as an effect, that the friction material composition provides excellent wear resistance at a high temperature and less abnormal sound without using copper having a high environmental load.

PRIOR ART DOCUMENTS

Patent Document

Patent Document 1: JP-A-09-13009
Patent Document 2: WO 2016/060129
Patent Document 3: JP-A-2016-79246

DISCLOSURE OF THE INVENTION

Problems to be Solved by the Invention

In recent years, research and development of brake pads that do not use asbestos (non-asbestos organic brake pads (NAO brake pads)) have been advanced. Examples of the weak point of the NAO brake pads include a decrease in a braking force (fade phenomenon) due to continuous use. A large decrease in a μ value due to the fade phenomenon leads to discomfort during braking. In recent years, brake pads having a high μ value tend to be required, but the high μ value is disadvantageously apt to cause a large difference between a μ value during sudden braking and a μ value during light braking. The large difference between the μ value during sudden braking and the μ value during light braking leads to discomfort during braking.

Hereinafter, in the present specification, a small difference between the μ value during sudden braking and the μ value during light braking means excellent friction stability.

The present invention has been made in view of the above problems, and an object of the present invention is to provide a cerium-based complex oxide powder which can provide a friction material having excellent fade resistance and friction stability while having a high μ value when the complex oxide powder is used for a friction material of a brake pad. Another object of the present invention is to provide a friction material composition containing the cerium-based complex oxide powder. Still another object of the present invention is to provide a friction material including a molded body composed of the friction material composition.

Means for Solving the Problems

The present inventors have conducted intensive studies on a powder used for a friction material of a brake pad. As a result, the present inventors have surprisingly found that the use of a powder obtained by mixing a ceria powder with an alumina powder, and melting and pulverizing the mixture, for the friction material of the brake pad provides the friction material having excellent fade resistance and friction stability while having a high μ value, and completed the present invention.

That is, a cerium-based complex oxide powder according to the present invention contains cerium and aluminum, and has a specific surface area of 0.5 $m^2/g$ or more and 10 $m^2/g$ or less.

According to the study of the present inventors, a powder of cerium oxide (ceria) containing no aluminum provides excellent fade resistance, but cannot provide a high μ value and results in poor friction stability. Meanwhile, in the present invention, a cerium-based complex oxide powder contains aluminum in addition to cerium and has a specific surface area of 10 $m^2/g$ or less, whereby, the use of the cerium-based complex oxide powder for a friction material of a brake pad can provide the friction material having excellent fade resistance and friction stability while having a high μ value. This is also clear from Examples.

Details are not clear as to the point that when a cerium-based complex oxide powder containing aluminum in addition to cerium is used, it is possible to obtain a friction material having excellent fade resistance and excellent friction stability while having a high μ value, but the present inventors infer as follows.

Cerium contributes to fade resistance as a main role. Cerium is known to have a high oxygen storage capacity. In braking under a high load, a surface of the brake pad may be 400° C. or higher due to frictional heat. Therefore, a strong reducing gas may be generated by burning a resin solidifying the brake pad. Then, it is considered that a metal oxide added as an abrasive is reduced by the gas, and a friction coefficient may be reduced. Cerium has a property of releasing oxygen around 400° C. when the atmosphere is in a reduced state. Therefore, it can be expected that the metal oxide is not reduced and the friction coefficient is not reduced.

In addition, cerium aluminate contributes to a high μ value and frictional stability as a main role. Alumina alone is not practical because it has too high hardness and high aggressiveness to a rotor disc. In addition, a necessary friction coefficient cannot be obtained by cerium alone. On the other hand, cerium aluminate has less disadvantages such as alumina alone and cerium alone, is excellent in fade resistance, and can provide a friction material excellent in friction stability while having a high μ value.

In the above configuration, a cerium-based complex oxide powder preferably contains zirconium.

When a cerium-based complex oxide powder contains zirconium and aluminum in addition to cerium, it is easy to obtain a friction material having excellent fade resistance and excellent friction stability while having a high μ value. The details are not clear in the point that the cerium-based complex oxide powder containing zirconium and aluminum in addition to cerium makes it easy to provide the friction material having excellent fade resistance and friction stability while having a high μ value, but the present inventors infer that such characteristics are obtained because the cerium-based complex oxide powder has two crystal phases of a crystal phase in which zirconia and ceria are solid-solubilized and a crystal phase containing cerium and aluminum. The present inventors infer that the specific surface area of 10 $m^2/g$ or less can provide a high hardness, whereby a high μ value can be obtained.

Patent Documents 1 to 3 do not disclose a cerium-based complex oxide powder containing three elements of cerium, zirconium, and aluminum. Patent Documents 1 to 3 do not disclose a problem or an effect of combining three characteristics of excellent fade resistance, high μ value, and excellent friction stability.

In the above configuration, a cerium-based complex oxide powder preferably has a crystallite diameter of 10 nm or more and 80 nm or less.

When a crystallite diameter is 10 nm or more, sufficient crystal growth can be achieved, whereby characteristics such as a high μ value can be easily obtained.

In the above configuration, the complex oxide powder preferably has a particle diameter $D_{50}$ of 0.5 μm or more and 20 μm or less.

When the particle diameter $D_{50}$ is 0.5 μm or more and 20 μm or less, characteristics such as a high μ value can be more easily obtained.

In the above configuration, the complex oxide powder preferably has a particle diameter $D_{99}$ of 60 μm or less.

When the particle diameter $D_{99}$ is 60 μm or less, characteristics such as a high μ value can be more easily obtained.

In the above configuration, the complex oxide powder preferably has a grain crushing strength of 50 N or more and 300 N or less.

When the grain crushing strength is 50 N or more, the strength of the particle is high, whereby characteristics such as a high μ value can be particularly easily obtained.

In the above configuration, it is preferable that a content of cerium is 40% by mass or more and 95% by mass or less in terms of oxide;

a content of zirconium is 0.1% by mass or more and 50% by mass or less in terms of oxide; and a content of aluminum is 0.1% by mass or more and 24% by mass or less in terms of oxide.

When a content of cerium is 40% by mass or more and 95% by mass or less in terms of oxide; a content of zirconium is 0.1% by mass or more and 50% by mass or less in terms of oxide; and a content of aluminum is 0.1% by mass or more and 24% by mass or less in terms of oxide, a suitable ratio for obtaining characteristics such as a high μ value is obtained.

As described above, the present inventors infer that a cerium-based complex oxide powder has two crystal phases of a crystal phase in which zirconia and ceria are solid-solubilized and a crystal phase containing cerium and aluminum, whereby characteristics such as a high μ value are easily obtained.

Here, it is presumed that, when the content of cerium is 40% by mass or more and 95% by mass or less in terms of oxide; the content of zirconium is 0.1% by mass or more and 50% by mass or less in terms of oxide; and the content of aluminum is 0.1% by mass or more and 24% by mass or less in terms of oxide, two of the crystal phase in which zirconia and ceria are solid-solubilized and the crystal phase containing cerium and aluminum form a suitable ratio for obtaining characteristics such as a high μ value.

In the above configuration, it is preferable that a content of aluminum is 0.1% by mass or more and 10% by mass or less in terms of oxide.

In the above configuration, it is preferable that a content of zirconium is 0.1% by mass or more and 40% by mass or less in terms of oxide; and a content of aluminum is 0.1% by mass or more and 10% by mass or less in terms of oxide.

In the above configuration, it is preferable that a content of cerium is 49% by mass or more and 91% by mass or less in terms of oxide; a content of zirconium is 1% by mass or more and 43% by mass or less in terms of oxide; and a content of aluminum is 1% by mass or more and 8% by mass or less in terms of oxide.

When the content of cerium is 49% by mass or more and 91% by mass or less in terms of oxide; the content of zirconium is 1% by mass or more and 43% by mass or less in terms of oxide; and the content of aluminum is 1% by mass or more and 8% by mass or less in terms of oxide, a more suitable ratio for obtaining characteristics such as a high μ value is formed.

In the above configuration, the total content of cerium, zirconium, and aluminum is preferably 60% by mass or more in terms of oxide.

In the above configuration, the complex oxide powder preferably contains $CeAlO_3$.

When the complex oxide powder contains $CeAlO_3$, the complex oxide powder provides more excellent characteristics such as a high μ value.

In the above configuration, the complex oxide powder preferably contains a rare earth element other than cerium.

When the complex oxide powder contains the rare earth element other than cerium, the crystal phase is stable, whereby a higher μ value can be obtained.

In the above configuration, the complex oxide powder preferably contains a rare earth element other than cerium within a range of 0.1% by mass or more and 40% by mass or less in terms of oxide.

When the complex oxide powder contains a rare earth element other than cerium within a range of 0.1% by mass or more and 40% by mass or less in terms of oxide, the crystal phase is more stable, whereby a higher μ value can be obtained.

In the above configuration, the rare earth element other than cerium is preferably one or more selected from the group consisting of yttrium and lanthanum.

When the rare earth element other than cerium is one or more selected from the group consisting of yttrium and lanthanum, the crystal phase is stable, whereby a high μ value can be obtained.

In the above configuration, the complex oxide powder may contain an alkaline earth element.

When the complex oxide powder contains the alkaline earth element, the alkaline earth element has slightly poorer stability than that of a rare earth element such as yttria, but the complex oxide powder can be produced at low cost.

In the above configuration, the complex oxide powder is preferably used for a friction material.

The use of the cerium-based complex oxide powder for a friction material of a brake pad provides the friction material having excellent fade resistance and friction stability while having a high μ value, whereby the cerium-based complex oxide powder can be suitably used for the friction material.

A friction material composition according to the present invention contains a friction modifier, a fiber base material, and a binder, wherein the friction modifier is the cerium-based complex oxide powder.

According to the above configuration, the friction material composition contains the cerium-based complex oxide powder as the friction modifier, whereby, when the friction material composition is molded, and the molded product is used for a friction material of a brake pad, the friction material having excellent fade resistance and friction stability while having a high μ value can be obtained.

In the above configuration, a content of the cerium-based complex oxide powder is preferably 5% by mass or more and 20% by mass or less when a total of the friction material composition is 100% by mass.

When the content of the cerium-based complex oxide powder is within a range of 5% by mass or more and 20% by mass or less when a total of the friction material composition is 100% by mass, characteristics such as a high μ value can be more easily obtained.

A friction material according to the present invention includes a molded body composed of the friction material composition.

According to the above configuration, the friction material includes the molded body composed of the friction material composition, whereby the friction material having excellent fade resistance and friction stability while having a high μ value can be obtained.

In the above configuration, it is preferable that a first fade test measured under the following measurement condition A is performed 9 times in accordance with the Japanese Automobile Standard Organization JASO C406; and an average value of a maximum value μ value and a minimum value μ value when a minimum friction coefficient is indicated is calculated in an obtained behavior peak, and the average value is 0.20μ or more.

<Measurement Condition A>

Braking initial speed: 100 km/h
Braking interval: 35 seconds
Brake temperature prior to braking during first measurement: 80° C.
Braking deceleration: 0.45 G
Braking frequency: 9

When the above numerical value is 0.20μ or more, discomfort during braking can be further reduced.

In the above configuration, it is preferable that a lapping μ value, which is an average value of friction coefficients measured under the following measurement condition B in accordance with the Japanese Automobile Standard Organization JASO C406, is 0.39 or more.

<Measurement Condition B>

Braking initial speed: 65 km/h
Brake temperature prior to braking: 120° C.
Braking deceleration: 0.35 G
Number of measurements: 200

When the lapping μ value is 0.39 or more, a stronger braking force is obtained with small pressing.

In the above configuration, it is preferable that, when a friction coefficient X is an average value of friction coefficients measured 8 times in a second effectiveness test under the following measurement condition C in accordance with the Japanese Automobile Standard Organization JASO C406, and a friction coefficient Y is an average value of friction coefficients measured 8 times in the second effectiveness test under the following measurement condition D in accordance with the Japanese Automobile Standard Organization JASO C406, a difference between the friction coefficients [(friction coefficient X)−(friction coefficient Y)] is 0.12 or less.

<Measurement Condition C>

Braking initial speed: 100 km/h
Brake temperature prior to braking: 80° C.
Braking deceleration: 0.2 G
Number of measurements: 8

<Measurement Condition D>

Braking initial speed: 100 km/h
Brake temperature prior to braking: 80° C.
Braking deceleration: 0.7 G
Number of measurements: 8

When the difference between the friction coefficients [(friction coefficient X)−(friction coefficient Y)] is 0.12 or less, discomfort during braking can be further reduced.

Effect of the Invention

The present invention can provide a cerium-based complex oxide powder. The use of the complex oxide powder for a friction material of a brake pad can provide the friction material having excellent fade resistance and friction stability while having a high μ value. A friction material composition containing the cerium-based complex oxide powder can be provided. A friction material including a molded body composed of the friction material composition can be provided.

BRIEF DESCRIPTION OF THE DRAWINGS

FIG. 1 is an X-ray diffraction spectrum of a cerium-based complex oxide powder according to Example 4.

MODE FOR CARRYING OUT THE INVENTION

Hereinafter, embodiments of the present invention will be described. However, the present invention is not limited only to these embodiments. In the present specification, zirconia (zirconium oxide) is common, and contains 10, by mass or less of an impure metal compound (inevitable impurities) including hafnia.

Cerium-Based Complex Oxide Powder

A cerium-based complex oxide powder according to the present embodiment contains cerium and aluminum, and has a specific surface area of 0.5 $m^2/g$ or more and 10 $m^2/g$ or less.

The cerium-based complex oxide powder (hereinafter, also referred to as "complex oxide powder") according to the present embodiment contains aluminum in addition to cerium and has a specific surface area of 10 $m^2/g$ or less, whereby the use of the complex oxide powder for a friction material of a brake pad makes it possible to provide the friction material having excellent fade resistance and friction stability while having a high μ value. This is also clear from Examples.

(Composition of Complex Oxide Powder)

The complex oxide powder according to the present embodiment contains cerium (Ce) and aluminum (Al) as a whole, and is formed as a complex of a plurality of kinds of oxides. The complex oxide powder according to the present embodiment preferably further contains zirconium (Zr). The complex of a plurality of kinds of oxides refers to a complex in which two or more oxides having different composition ratios are integrally combined.

The complex oxide powder according to the present embodiment is not a mixture of ceria (cerium oxide) and alumina (aluminum oxide). When zirconium is further contained, the complex oxide powder according to the present embodiment is not a mixture of ceria (cerium oxide), zirconia (zirconium dioxide), and alumina (aluminum oxide).

The content of cerium contained in the complex oxide powder is preferably 40% by mass or more, more preferably 49% by mass or more, still more preferably 53% by mass or more, particularly preferably 56% by mass or more, and especially preferably 60% by mass or more, in terms of oxide.

The content of cerium contained in the complex oxide powder is preferably 95% by mass or less, more preferably 92% by mass or less, still more preferably 91% by mass or less, particularly preferably 90% by mass or less, and especially particularly preferably 88% by mass or less, in terms of oxide.

The temperature of the surface of the friction material reaches 400 to 800° C. due to friction heat, whereby a resin component contained in the friction material evaporates. At that time, a strong reducing atmosphere is provided by a generated evaporating gas. The complex oxide powder according to the present embodiment contains cerium oxide, whereby the reduction of the friction material can be suppressed by supplying oxygen according to the valence change of the cerium oxide. In particular, when the cerium oxide is contained in a large amount (when cerium is contained in an amount of 40% by mass or more in terms of oxide), the reduction of the friction material can be further suppressed. Usually, the friction material is an oxide, whereby the friction material is deprived of oxygen under a strong reducing atmosphere, which may cause a decreased hardness of the friction material. However, in the present embodiment, the friction material contains the cerium oxide, whereby a decrease in the hardness due to the reduction of the friction material is suppressed.

The content of zirconium contained in the complex oxide powder is preferably 0.1% by mass or more, more preferably 1% by mass or more, still more preferably 3% by mass or more, particularly preferably 4% by mass or more, and especially preferably 5% by mass or more, in terms of oxide.

The content of zirconium contained in the complex oxide powder is preferably 50% by mass or less, more preferably 45% by mass or less, still more preferably 43% by mass or less, particularly preferably 35% by mass or less, and especially preferably 30% by mass or less, in terms of oxide.

The content of aluminum contained in the complex oxide powder is preferably 0.1% by mass or more, more preferably 1% by mass or more, still more preferably 2% by mass or more, and particularly preferably 3% by mass or more, in terms of oxide.

The content of aluminum contained in the complex oxide powder is preferably 24% by mass or less, preferably 10% by mass or less, more preferably 8% by mass or less, still more preferably 7% by mass or less, particularly preferably 6% by mass or less, and especially preferably 5% by mass or less, in terms of oxide.

It is preferable that the contents of cerium, zirconium, and aluminum contained in the complex oxide powder are respectively 40% by mass or more and 95% by mass or less in terms of oxide, 0.1% by mass or more and 50% by mass or less in terms of oxide, and 0.1% by mass or more and 24% by mass or less in terms of oxide.

It is more preferable that the content of cerium is 49% by mass or more and 91% by mass or less in terms of oxide; the content of zirconium is 1% by mass or more and 43% by mass or less in terms of oxide; and the content of aluminum is 1% by mass or more and 8% by mass or less in terms of oxide.

When the contents of cerium, zirconium, and aluminum are within the above numerical ranges, a suitable ratio for obtaining characteristics such as a high μ value is formed.

The total content of cerium, zirconium, and aluminum is preferably 60% by mass or more in terms of oxide. The total content is more preferably 72% by mass or more, still more preferably 75% by mass or more, particularly preferably 80% by mass or more, especially preferably 85% by mass or more, and exceptionally preferably 87% by mass in terms of oxide. The total content is preferably as large as possible, and is, for example, 100% by mass or less, 97% by mass or less, 95% by mass or less, or 90% by mass or less in terms of oxide.

The complex oxide powder may contain a rare earth element other than cerium. When the complex oxide powder contains the rare earth element other than cerium, the crystal phase is stable, whereby a higher μ value can be obtained.

Examples of the rare earth element other than cerium include scandium, yttrium, lanthanum, praseodymium, neodymium, samarium, europium, gadolinium, terbium, dysprosium, holmium, erbium, thulium, ytterbium, lutetium, and the like. One or two or more rare earth elements other than cerium may be contained in the complex oxide powder. Among these, the rare earth element other than cerium is preferably one or more selected from the group consisting of yttrium and lanthanum, and particularly preferably yttrium. When yttrium and lanthanum are contained, particularly when yttrium is contained, the crystal phase is further stable, whereby a higher μ value can be obtained.

The content of the rare earth element other than cerium is preferably 0.1% by mass or more, and more preferably 1% by mass or more, in terms of oxide when the total of the complex oxide powder is 100% by mass.

The content of the rare earth element other than cerium is preferably 40% by mass or less, more preferably 15% by mass or less, still more preferably 10% by mass or less, particularly preferably 5% by mass or less, especially preferably 4% by mass or less, and exceptionally preferably 3% by mass or less in terms of oxide when the total mass of the complex oxide powder is 100% by mass.

When the complex oxide powder contains the rare earth element other than cerium within a range of 0.1% by mass or more and 26% by mass or less in terms of oxide, the crystal phase is more stable, whereby a higher μ value can be obtained.

The complex oxide powder may contain other elements as long as the effect of the present invention is not impaired. Examples of the other elements include an alkali element, an alkaline earth element, and a transition metal element. Specific examples of the other elements include calcium, magnesium, silicon, and titanium. These are preferably contained in the complex oxide powder as oxides.

The content of the other elements is preferably 40% by mass or less in terms of oxide when the total of the complex oxide powder is 100% by mass.

(Specific Surface Area)

The specific surface area of the complex oxide powder is 0.5 $m^2/g$ or more and 10 $m^2/g$ or less. The specific surface area is preferably 1 $m^2/g$ or more, more preferably 1.5 $m^2/g$ or more, still more preferably 1.8 $m^2/g$ or more, and particularly preferably 2 $m^2/g$ or more.

The specific surface area is preferably 4.5 $m^2/g$ or less, more preferably 4 $m^2/g$ or less, still more preferably 3.5 $m^2/g$ or less, particularly preferably 3.2 $m^2/g$ or less, and especially preferably 3 $m^2/g$ or less.

When the specific surface area is 0.5 $m^2/g$ or more and 10 $m^2/g$ or less, the complex oxide powder is likely to provide a melted and solidified product having desired crystallinity and strength. Due to the characteristics of the production method, a semi-melted and solidified product may be contained in the melted and solidified product.

Examples of a method for obtaining the complex oxide powder having the specific surface area include a method in which a zirconia powder and an alumina powder are mixed with a ceria powder, and the mixture is melted and pulverized.

The specific surface area of the complex oxide powder refers to a value obtained by a method described in Examples.

(Crystallite Diameter)

The crystallite diameter of the complex oxide powder is preferably 10 nm or more and 80 nm or less. The crystallite diameter is more preferably 20 nm or more, still more preferably 30 nm or more, and particularly preferably 35 nm or more. The crystallite diameter is more preferably 70 nm or less, still more preferably 65 nm or less, and particularly preferably 60 nm or less.

When the crystallite diameter is 10 nm or more, sufficient crystal growth can be achieved, whereby characteristics such as a high μ value can be easily obtained. Meanwhile, it is not necessary to excessively promote the crystal growth. There is no upper limit in the crystallite diameter, but in consideration of productivity, the crystallite diameter is preferably 80 nm or less.

The crystallite diameter is calculated by applying a measurement result of a peak appearing at 2θ of 40° to 42° in XRD measurement to the following Scherrer formula.

$$Dp=(K\times\lambda)/\beta\cos\theta$$

Here, Dp is the crystallite diameter of the complex oxide powder; λ is the wavelength of X-rays; θ is a diffraction angle; K is a constant referred to as a shape factor; and β is a peak width after the spreading of a diffraction line according to an apparatus is corrected.

The peak at 2θ of 40° to 42° is a peak derived from (111) of $CeAlO_3$.

XRD measurement conditions are as described in detail in Examples.

Examples of a method for obtaining the complex oxide powder having the crystallite diameter include a method in which a zirconia powder and an alumina powder are mixed with a ceria powder, and the mixture is melted and pulverized.

(Crystal Phase)

As described above, the complex oxide powder contains cerium and aluminum as a whole, and is formed as a complex of a plurality of kinds of oxides. When the complex oxide powder further contains zirconium, the complex oxide powder contains cerium, zirconium, and aluminum as a whole, and is formed as a complex of a plurality of kinds of oxides. Each oxide constituting the complex may contain at least one of cerium, zirconium, and aluminum, and need not contain all the three. The complex may further contain an oxide other than cerium, zirconium, and aluminum as a part of the complex. The complex may contain a compound (element) other than the oxide as a part of the complex.

Among them, the complex oxide powder is preferably a complex containing an oxide containing cerium and zirconia (hereinafter, also referred to as a crystal phase A) and an oxide containing cerium and aluminum (hereinafter, also referred to as a crystal phase B).

The crystal phase A is obtained by solid-solubilizing zirconia in ceria, and does not have a specific composition formula. When the complex oxide powder has the crystal phase A, the complex oxide powder has an oxygen storing/releasing capacity, and suppresses a decrease in the hardness of the friction material. The complex oxide powder provides more excellent characteristics such as a high μ value.

The composition formula of the crystal phase B is $CeAlO_3$.

When the complex oxide powder has two phases of the crystal phase A and the crystal phase B, the complex oxide powder can provide a friction material having excellent fade resistance and friction stability while having a high μ value.

When the complex oxide powder contains a rare earth element other than cerium, an oxide corresponding to the addition amount of the rare earth element other than cerium is contained as a part of the complex. In particular, when the complex oxide powder contains yttrium and lanthanum as the rare earth element other than cerium, these are solid-solubilized in ceria and zirconia.

(Particle Diameter $D_{50}$)

The particle diameter $D_{50}$ of the complex oxide powder is preferably 20 μm or less. The particle diameter $D_{50}$ is more preferably 0.8 μm or more, still more preferably 1 μm or more, particularly preferably 1.5 μm or more, especially preferably 2 μm or more, and peculiarly preferably 2.3 μm or more. The particle diameter $D_{50}$ is more preferably 15 μm or less, still more preferably 10 μm or less, particularly preferably 7 μm or less, especially preferably 5 μm or less, and peculiarly preferably 4 μm or less.

When the particle diameter $D_{50}$ is 20 μm or less, characteristics such as a high μ value can be more easily obtained.

(Particle diameter $D_{90}$)

The particle diameter $D_{90}$ of the complex oxide powder is preferably 25 μm or less. The particle diameter $D_{90}$ is more preferably 3 μm or more, still more preferably 5 μm or more, and particularly preferably 6.5 μm or more. The particle diameter $D_{90}$ is more preferably 21 μm or less, still more preferably 15 μm or less, particularly preferably 10 μm or less, and especially preferably 8 μm or less.

When the particle diameter $D_{90}$ is 25 μm or less, characteristics such as a high μ value can be more easily obtained.

(Particle Diameter $D_{99}$)

The particle diameter $D_{99}$ of the complex oxide powder is preferably 60 μm or less. The particle diameter $D_{99}$ is more preferably 50 μm or less, still more preferably 48 μm or less, particularly preferably 20 μm or less, and especially preferably 15 μm or less. The particle diameter $D_{99}$ is preferably 5 μm or more, more preferably 7 μm or more, still more preferably 10 μm or more, and particularly preferably 11 μm or more.

When the particle diameter $D_{99}$ is 60 μm or less, characteristics such as a high μ value can be more easily obtained.

The particle diameter $D_{50}$, the particle diameter $D_{90}$, and the particle diameter $D_{99}$ of the complex oxide powder refer to values obtained by a method described in Examples. The particle diameter $D_{50}$, the particle diameter $D_{90}$, and the particle diameter $D_{99}$ described in the present specification are measured on a volume basis. The particle diameter $D_{50}$ is a particle diameter corresponding to a cumulative value of 50% from a minimum particle size value measured by a laser diffraction method. The particle diameter $D_{90}$ is a particle diameter corresponding to a cumulative value of 90% from a minimum particle size value measured by a laser diffraction method. The particle diameter $D_{99}$ is a particle diameter corresponding to a cumulative value of 99% from a minimum particle size value measured by a laser diffraction method.

Examples of a method for obtaining the complex oxide powder having the particle diameter $D_{50}$, the particle diameter $D_{90}$, and the particle diameter $D_{99}$ include a method in which pulverization conditions when a zirconia powder and an alumina powder are mixed with a ceria powder, and the mixture is melted and pulverized to obtain a complex oxide powder are controlled.

(Grain Crushing Strength)

The grain crushing strength of the complex oxide powder is preferably 50 N or more and 300 N or less. The grain crushing strength is more preferably 70 N or more, still more preferably 80 N or more, particularly preferably 90 N or more, especially preferably 100 N or more, and peculiarly preferably 110 N or more. The upper limit of the grain crushing strength is not particularly limited, but the grain crushing strength may be 250 N or less, 230 N or less, 210 N or less, 190 N or less, or 180 N or less or the like.

The grain crushing strength is measured in a form of particles before pulverization. As the particles before pulverization, particles having a particle diameter of 2.36 mm to 2.80 mm are used. The particles having the particle diameter can be obtained using a commercially available sieve. The number of the particles to be measured is 50, and the average value thereof is taken as the grain crushing strength. A tensile compression tester is used as a measuring apparatus. Specifically, SV-201-NSL manufactured by Imada Seisakusho Co., Ltd. is used as the tensile compression tester. A load speed is 0.50 mm/min.

A method for measuring the grain crushing strength is as described in detail in Examples.

Examples of a method for obtaining the complex oxide powder having the grain crushing strength include a method in which a zirconia powder and an alumina powder are mixed with a ceria powder, and the mixture is melted and pulverized.

(Density (True Specific Gravity))

The true specific gravity of the complex oxide powder is preferably 6.0 g/cm$^3$ or more and 7.2 g/cm$^3$ or less. The true specific gravity is preferably 6.3 g/cm$^3$ or more, more preferably 6.5 g/cm$^3$ or more, and still more preferably 6.7 g/cm$^3$ or more. The true specific gravity is preferably 7.1 g/cm$^3$ or less, more preferably 7.0 g/cm$^3$ or less, and still more preferably 6.9 g/cm$^3$ or less.

When the true specific gravity is 6.0 g/cm$^3$ or more and 7.2 g/cm$^3$ or less, characteristics such as a high μ value can be more easily obtained.

The true specific gravity refers to a value measured in accordance with JIS Z8807:2012.

Examples of a method for obtaining the complex oxide powder having the true specific gravity include a method in which a zirconia powder and an alumina powder are mixed with a ceria powder, and the mixture is melted and pulverized.

The complex oxide powder according to the present embodiment has been described above.

Method for Producing Complex Oxide Powder

Hereinafter, an example of a method for producing a complex oxide powder will be described. However, the method for producing a complex oxide powder according to the present invention is not limited to the following exemplification.

The method for producing a complex oxide powder according to the present embodiment includes:

a step 1 of preparing a starting material;

a step 2 of applying a predetermined amount of heat to the starting material to melt the starting material;

a step 3 of cooling the melt obtained in the step 2 to form an ingot;

a step 4 of pulverizing the ingot obtained in the step 3 into a powder; and a step 5 of heating the powder obtained in the step 4 under an atmosphere of 400 to 1100° C.

<Step 1>

In the method for producing a complex oxide powder according to the present embodiment, first, a starting material is prepared. Specifically, for example, a cerium raw material and an aluminum raw material are prepared. Further, a zirconium raw material is further prepared as necessary.

The cerium raw material is a material for mainly introducing a cerium element into a complex oxide powder. The phrase "mainly introducing a cerium element into a complex oxide powder" refers to introducing the cerium element in a larger amount (introducing the cerium element in an amount larger than the equimolecular amount) than that of other elements (zirconium, aluminum, and rare earth elements other than cerium). That is, the cerium raw material may contain zirconium, aluminum, and rare earth elements other than cerium as long as the amount thereof is smaller (the number of moles thereof is smaller) than that of the cerium element.

The cerium raw material is not particularly limited, but preferably contains cerium oxide. The cerium oxide can be synthesized from various raw materials such as a nitrate, a carbonate, a sulfate, an acetate, a chloride, and a bromide. The cerium raw material may be a complex oxide of cerium and aluminum. The cerium raw material may be a complex oxide of cerium, zirconium, and aluminum. The cerium raw material may contain a compound such as a nitrate, carbonate, sulfate, chloride, or bromide of cerium. The cerium raw material may contain a compound such as a nitrate, carbonate, sulfate, chloride, or bromide of zirconium.

The zirconium raw material is a material for mainly introducing a zirconium element into a complex oxide powder. The phrase "mainly introducing a zirconium element into a complex oxide powder" refers to introducing the zirconium element in a larger amount (introducing the zirconium element in an amount larger than the equimolecular amount) than that of other elements (cerium, aluminum, and rare earth elements other than cerium). That is, the zirconium raw material may contain zirconium, aluminum, and the rare earth elements other than cerium as long as the amount thereof is smaller (the number of moles thereof is smaller) than that of the zirconium element.

The zirconium raw material is not particularly limited, but for example, various zirconium-based materials such as baddeleyite, desilicated zirconia, and zirconium oxide, and a zirconium material containing zirconium oxide, and the like can be used. The zirconium oxide can be synthesized from various raw materials such as a nitrate, a carbonate, a sulfate, an acetate, a chloride, and a bromide. The zirconium raw material may contain a complex oxide of zirconium and at least one element of cerium and a rare earth element other than cerium. The zirconium raw material may contain a compound such as a nitrate, carbonate, sulfate, chloride, or bromide of cerium. The zirconium raw material may contain a compound such as a nitrate, carbonate, sulfate, chloride, or bromide of zirconium. As the zirconium raw material, a raw material containing no radioactive element is desirably used.

The aluminum raw material is a material for mainly introducing an aluminum element into a complex oxide powder. The phrase "mainly introducing an aluminum element into a complex oxide powder" refers to introducing the aluminum element in a larger amount (introducing the aluminum element in an amount larger than the equimolecular amount) than that of other elements (cerium, zirconium, and rare earth elements other than cerium). That is, the aluminum raw material may contain cerium, zirconium, and rare earth elements other than cerium as long as the amount thereof is smaller (the number of moles thereof is smaller) than that of the aluminum element.

The aluminum raw material is not particularly limited, but preferably contains aluminum oxide. The aluminum oxide can be synthesized from various raw materials such as a nitrate, a carbonate, a sulfate, an acetate, a chloride, and a bromide. The aluminum raw material may be a complex oxide of zirconium and at least one element of cerium and a rare earth element other than cerium. The aluminum raw material may contain a compound such as a nitrate, carbonate, sulfate, chloride, or bromide of cerium. The aluminum raw material may contain a compound such as a nitrate, carbonate, sulfate, chloride, or bromide of zirconium.

In step 1, a raw material containing a rare earth element other than cerium (hereinafter, also referred to as a "third element raw material") may be prepared as the raw material.

The third element raw material is a material for mainly introducing a rare earth element other than cerium (hereinafter, also referred to as a "third element") into a complex oxide powder. The phrase "mainly introducing a third element into a complex oxide powder" means that the third element is introduced in an amount larger (the number of moles thereof is larger) than that of other elements (cerium, zirconium, aluminum). That is, the third element raw material may contain cerium, zirconium, and aluminum as long as the amount thereof is smaller (the number of moles thereof is smaller) than that of the third element.

The third element is preferably yttria. Yttria (yttrium oxide) can be synthesized from various raw materials such as a nitrate, a carbonate, a sulfate, an acetate, a chloride, and a bromide.

In the present specification, the phrase "step 1 of preparing a raw material" means that, in step 1, a material for introducing a cerium element and a material for introducing an aluminum element may be finally prepared as a whole, and it is not necessary to prepare the cerium raw material and the aluminum raw material in a clearly distinguished manner.

The purities of the cerium raw material, the zirconium raw material, the aluminum raw material, and the third element raw material are not particularly limited, but are preferably 99.9% or more in that the purity of a desired product can be increased. As described above, the respective raw materials of the cerium raw material, the zirconium raw material, the aluminum raw material, and the third element raw material may contain other substances as long as the properties of the complex oxide powder are not inhibited. Examples of the other substances include the nitrates, carbonates, sulfates, chlorides, and bromides of cerium and zirconium as described above. An alkali element, an alkaline earth element, and a transition metal element and the like may be contained as the other substances. Among them, the alkaline earth element is preferable. When the complex oxide powder contains the alkaline earth element, the alkaline earth element has slightly poorer stability than that of a rare earth element such as yttria, but the complex oxide powder can be produced at low cost.

The alkaline earth element is preferably Ca, Mg, Sr, and Ba, more preferably Ca, Mg, and Sr, still more preferably Ca and Mg, and particularly preferably Ca. Ca is not only obtained from an inexpensive raw material, but also relatively easily solid-solubilized in zirconia, and thus is easily produced.

The raw materials are prepared, and then blended so that the contents of cerium and aluminum are within predetermined ranges. When zirconium is contained, the raw materials are prepared, and then blended so that the contents of cerium, zirconium, and aluminum are within predetermined ranges.

<Step 2>

Next, the starting material is melted by applying a predetermined amount of heat to the starting material. In step 2, it is preferable to melt all the raw materials. When all the raw materials are melted, the crystal structure of the obtained complex oxide powder is stable, whereby characteristics such as high p can be obtained. In order to melt all the raw materials, it is only required to apply a heat amount to the starting material so as to have a temperature equal to or higher than the highest melting point among the melting points of the various raw materials contained in the starting material.

The method for melting the starting material is not particularly limited, but examples thereof include melting methods such as an arc type melting method and a high-frequency thermal plasma type melting method. Among them, it is preferable to employ a general electromelting method, that is, a melting method using an arc type electric furnace (melting apparatus).

The starting material may be heated by, for example, applying heat with electric power of 0.5 to 2.5 kWh/kg in terms of electric power consumption. By the heating, the temperature of the starting material can be increased to a temperature exceeding the highest melting point among the melting points of the various materials contained in the starting material, whereby a melt of the starting material can be obtained.

When the melting method using the arc type electric furnace is employed, a predetermined amount of a conductive material such as coke may be added to the starting material in advance before the heating step (step 2) is performed, in order to facilitate the initial energization. However, the addition amount of coke, and the like can be appropriately determined depending on the mixing ratio of the raw materials used in step 1.

The atmosphere during the melting of the starting material in step 2 is not particularly limited, and air, a nitrogen atmosphere, or an inert gas atmosphere such as argon or helium can be employed. The pressure during the melting is also not particularly limited, and may be any of atmospheric pressure, increased pressure, and reduced pressure. Usually, the melting is usually performed under atmospheric pressure.

<Step 3>

Next, the melt obtained in step 2 is cooled (preferably, gradually cooled) to form an ingot. A method for forming the ingot is not particularly limited, but examples thereof include a method in which an electric furnace is covered with a carbon lid, and the melt is gradually cooled over 10 to 60 hours when the melting of step 2 is performed in the electric furnace. A gradual cooling time is preferably 20 to 50 hours, more preferably 30 to 45 hours, and still more preferably 35 to 40 hours. When the melt is gradually cooled, for example, the melt may be naturally cooled in air so that the temperature of the melt is 100° C. or lower, and preferably 50° C. or lower. When the temperature of the melt may rapidly decrease so that the time of gradual cooling is shorter than 20 to 60 hours, the melt may be appropriately heated in the gradual cooling step to avoid the rapid temperature decrease in the melt.

As described above, the melt is gradually cooled while the rapid temperature decrease in the melt during the gradual cooling step is avoided, whereby the elements contained in the raw materials are likely to be uniformly combined with each other.

<Step 4>

Next, the ingot obtained in step 3 is pulverized into a powder. A method for pulverizing the ingot is not particularly limited, but examples thereof include a method in which the ingot is pulverized with a pulverizer such as a jaw crusher or a roll crusher. The pulverization may be performed by using a plurality of pulverizers in combination. The ingot may be pulverized so that the average particle diameter of the pulverized powder is 3 mm or less, and if necessary, 1 mm or less in consideration of the handleability of the powder in the subsequent step. The pulverized product may be classified. For example, a powder having a desired average particle diameter can be collected using a sieve or the like.

<Step 5>

Next, the powder obtained in step 4 is heated in an atmosphere of 400 to 1100° C. When the above heating is performed, it is preferable to subject the powder to magnetic separation in advance to separate impurities and the like. Thereafter, the powder may be heated in an atmosphere of 400 to 1100° C. using an electric furnace or the like. The powder is heated and fired by this heating, and suboxides generated in the melting step or strains generated in the crystal due to supercooling in step 3 can be removed. The heating temperature is preferably 400° C. to 1000° C., and more preferably 600° C. to 800° C. In any case, the suboxides and the strains in the crystal are likely to be removed. A heating time is not particularly limited, but may be, for example, 1 to 5 hours, and preferably 2 to 3 hours. The heating may be performed in air or in an oxygen atmosphere.

As described above, a solid or powdery complex oxide is obtained. When the powdery complex oxide is obtained, this may be used as the complex oxide powder according to the present embodiment.

<Step 6>

The solid or powdery complex oxide obtained in step 5 may be further finely pulverized with a pulverizer such as a planetary mill, a ball mill, or a jet mill.

Appropriately, the complex oxide may be finely pulverized depending on the purpose of use of the complex oxide. When the complex oxide is finely pulverized, the complex oxide may be treated with the pulverizer for about 5 to 30 minutes. When the complex oxide is finely pulverized, the average particle size of the complex oxide is preferably in the above range.

As described above, the complex oxide powder according to the present embodiment can be obtained.

Friction Material Composition

A friction material composition according to the present embodiment contains a friction modifier, a fiber base material, and a binder. The friction modifier is the complex oxide powder.

The friction modifier is the complex oxide powder, whereby, when the friction material composition is molded, and the molded product is used for a friction material of a brake pad, the friction material having excellent fade resistance and friction stability while having a high μ value can be obtained.

(Friction Modifier)

The friction modifier contains an inorganic filler and an organic filler.

The inorganic filler is added for the purpose of avoidance of deterioration in the heat resistance of the friction material, and improvement in the wear resistance, friction coefficient, and lubricity of the friction material, and the like.

The inorganic filler contains the complex oxide powder.

The content of the complex oxide powder in the friction material composition is preferably 5 by mass or more and 20% by mass or less, and more preferably 7% by mass or more and 15% by mass or less when the total of the friction material composition is 100% by mass. The content of the complex oxide powder is 5% by mass or more and 20% by mass or less when a total of the friction material composition is 100% by mass, whereby characteristics such as a high μ value can be more easily obtained.

As the inorganic filler, in addition to the complex oxide powder, for example, tin sulfide, bismuth sulfide, molybdenum disulfide, iron sulfide, antimony trisulfide, zinc sulfide, calcium hydroxide, calcium oxide, sodium carbonate, barium sulfate, coke, mica, vermiculite, calcium sulfate, talc, clay, zeolite, mullite, chromite, titanium oxide, magnesium oxide, silica, graphite, mica, dolomite, calcium carbonate, magnesium carbonate, granular or plate-shaped titanate, calcium silicate, manganese dioxide, zinc oxide, ferrosoferric oxide, and PTFE (polytetrafluoroethylene) and the like can be used. These can be used alone or in combination of two or more. As the granular or plate-like titanate, potassium hexatitanate, potassium octatitanate, lithium potassium titanate, magnesium potassium titanate, and sodium titanate and the like can be used.

The content of the inorganic filler (the content of the entire inorganic filler containing the complex oxide powder) in the friction material composition is preferably 20 to 70% by mass, more preferably 30 to 65% by mass, and particularly preferably 35 to 60% by mass when the total of the friction material composition is 100% by mass. By setting the content of the inorganic filler within the above range, deterioration in the heat resistance can be avoided, and the content of the inorganic filler is also preferable from the viewpoint of the content balance of other components of the friction agent.

The organic filler is added for friction modification for improving the resistance to sound and vibration and the wear resistance of the friction material, and the like.

The organic filler is not particularly limited as long as the above performances can be exhibited, and a commonly used organic filler is used. Examples thereof include a cashew dust and a rubber component.

The cashew dust is obtained by curing a cashew nut shell oil and pulverizing.

Examples of the rubber component include a tire rubber, an acrylic rubber, an isoprene rubber, a nitrile butadiene rubber (NBR), a styrene butadiene rubber (SBR), a chlorinated butyl rubber, a butyl rubber, a silicone rubber, and the like. These rubbers to be selected may be used alone or in combination of two or more.

The content of the organic filler in the friction material composition is preferably 1 to 25% by mass, more preferably 1 to 10% by mass, and particularly preferably 2 to 7% by mass when the total of the friction material composition is 100% by mass. By setting the content of the organic filler within the above range, the elastic modulus of the friction material increases, whereby deterioration in the resistance to sound and vibration such as brake noise can be effectively suppressed. Furthermore, deterioration in the heat resistance and a decrease in the strength due to heat history can also be effectively suppressed.

(Fiber Base Material)

The fiber base material exhibits a reinforcing action in the friction material.

In the friction material composition, an organic fiber, an inorganic fiber, a metal fiber, and a carbon-based fiber and the like, which are used as the fiber base material, can be usually used, and these can be used alone or in combination of two or more.

As the organic fiber, an aramid fiber, a cellulose fiber, an acrylic fiber, and a phenol resin fiber and the like can be used, and these can be used alone or in combination of two or more.

As the inorganic fiber, a ceramic fiber, a biodegradable ceramic fiber, a mineral fiber, a glass fiber, and a silicate fiber and the like can be used, and these can be used alone or in combination of two or more.

The metal fiber is not particularly limited as long as the metal fiber is usually used for the friction material, and for example, a fiber containing a metal such as aluminum, iron, cast iron, zinc, tin, titanium, nickel, magnesium, silicon, copper, or brass, or an alloy as a main component can be used (the amount of copper is desirably 5% or less in order to correspond to regulations in 2020).

As the carbon-based fiber, a flame resistant fiber, a pitch-based carbon fiber, a PAN based carbon fiber, and an activated carbon fiber and the like can be used, and these can be used alone or in combination of two or more.

The content of the fiber base material in the friction material composition is preferably 5 to 40% by mass, more preferably 5 to 205 by mass, and particularly preferably 5 to 15% by mass when the total of the friction material composition is 100% by mass. When the content of the fiber base material is 5 to 40% by mass, the optimum porosity of the friction material can be obtained; noise can be prevented; the appropriate material strength can be obtained; the wear resistance can be exhibited; and the moldability can be improved.

(Binder)

The binder has a function of integrally bonding materials constituting the friction material composition to improve the strength as the friction material (brake friction material).

As the binder, a thermosetting resin can be used as a commonly used binder.

Examples of the thermosetting resin include an epoxy resin; an acrylic resin; a silicon resin; a thermosetting fluorine-based resin; a phenol resin; various elastomer-dispersed phenol resins such as an acrylic elastomer-dispersed phenol resin and a silicon elastomer-dispersed phenol resin; an acryl-modified phenol resin, a silicon-modified phenol resin, a cashew-modified phenol resin, an epoxy-modified phenol resin, and an alkylbenzene-modified phenol resin, and these can be used alone or in combination of two or more. In particular, it is preferable to use a phenol resin, an acrylic-modified phenol resin, a silicon-modified phenol resin, or an alkylbenzene-modified phenol resin capable of providing excellent heat resistance, moldability, and friction coefficient.

The content of the binder in the friction material composition is preferably 3 to 20% by mass, and more preferably 5 to 10% by mass when the total of the friction material composition is 100% by mass. When the content is within this range, the strength of the friction material can be highly maintained, and deterioration in resistance to sound and vibration such as brake noise caused by decreasing the porosity of the friction material to increase the elastic modulus can be more effectively suppressed.

The friction material composition can be obtained by blending the respective components and optional components if necessary at a predetermined ratio. At this time, it is preferable to include a step of pulverizing and mixing the respective components and the optional components in a dispersion medium with a ball mill or the like for a predetermined time, then drying the mixture to remove the dispersion medium, and classifying the dried mixture using a sieve or the like.

Friction Material

The friction material according to the present embodiment includes a molded body composed of the friction material composition.

The friction material can be obtained by molding the friction material composition and, if necessary, sintering the molded product. In the molding step and the sintering step, a known ceramic molding method and sintering method can be used. Examples of the molding method include dry molding methods such as uniaxial pressure molding, and cold isostatic molding. As the molding method, in addition to the dry molding method, injection molding, extrusion molding, slip casting, pressure casting, rotary casting, and doctor blade methods and the like can also be applied. Examples of the sintering method include an atmosphere sintering method, a reaction sintering method, a normal pressure sintering method, a thermal plasma sintering method, and the like. A sintering temperature and a holding time at the sintering temperature can be appropriately set according to the raw materials to be used. The sintering may be performed in air or in an inert gas such as nitrogen gas and argon gas depending on the type of ceramics and the type of a material to be added, or may be performed in a reducing gas such as carbon monoxide gas or hydrogen gas. The sintering may also be performed in vacuum. Furthermore, the sintering may also be performed under pressure. Thereafter, the friction material according to the present embodiment is obtained by applying treatments such as cutting, grinding, and polishing to the sintered body if necessary.

The friction material can be integrally bonded with a back plate composed of a metal such as iron to form a brake pad including the friction material and the back plate. The brake pad including the friction material and the back plate can also be obtained by thermoforming together with the friction material composition.

In the friction material, a first fade test measured under the following measurement condition A is performed 9 times in accordance with the Japanese Automobile Standard Organization JASO C406. An average value of a maximum value μ value and a minimum value μ value when a minimum friction coefficient is indicated is calculated in an obtained behavior peak. The average value is preferably 0.20μ or more, more preferably 0.22μ or more, still more preferably 0.24μ or more, particularly preferably 0.25μ or more, especially preferably 0.27μ or more, and peculiarly preferably 0.28μ or more. As this numerical value is higher, discomfort during braking can be further reduced. The average value of the friction coefficients is preferably larger, but examples thereof include 0.4 or less, 0.35 or less, and 0.33 or less.

<Measurement Condition A>

Braking initial speed: 100 km/h

Braking interval: 35 seconds

Brake temperature prior to braking during first measurement: 80° C.

Braking deceleration: 0.45 G

Braking frequency: 9

In the friction material, a lapping μ value, which is an average value of friction coefficients measured under the following measurement condition B in accordance with the Japanese Automobile Standard Organization JASO C406, is preferably 0.39 or more, more preferably 0.40 or more, still more preferably 0.405 or more, particularly preferably 0.41 or more, especially preferably 0.42 or more, exceptionally preferably 0.43 or more, and more exceptionally preferably 0.44 or more. The lapping μ value is preferably larger, but examples thereof include 0.6 or less, 0.55 or less, and 0.53 or less. When the lapping μ value is 0.39 or more, a stronger braking force is obtained with small pressing.

<Measurement Condition B>

Braking initial speed: 65 km/h

Brake temperature prior to braking: 120° C.

Braking deceleration: 0.35 G

Number of measurements: 200

In the friction material, when a friction coefficient X is an average value of friction coefficients measured 8 times in a second effectiveness test under the following measurement condition C in accordance with the Japanese Automobile Standard Organization JASO C406, and a friction coefficient Y is an average value of friction coefficients measured 8 times in the second effectiveness test under the following measurement condition D in accordance with the Japanese Automobile Standard Organization JASO C406, a difference between the friction coefficients [(friction coefficient X)−(friction coefficient Y)] is preferably 0.12 or less, more preferably 0.11 or less, still more preferably 0.10 or less, particularly preferably 0.09 or less, especially preferably 0.08 or less, and peculiarly preferably 0.05 or less. The difference between the friction coefficients [(friction coefficient X)−(friction coefficient Y)] is preferably smaller, but examples thereof include 0.01 or more, 0.02 or more, and 0.03 or more. When the difference between the friction coefficients [(friction coefficient X)−(friction coefficient Y)] is 0.12 or less, discomfort during braking can be further reduced.

<Measurement Condition C>

Braking initial speed: 100 km/h

Brake temperature prior to braking: 80° C.

Braking deceleration: 0.2 G

Number of measurements: 8

<Measurement Condition D>

Braking initial speed: 100 km/h

Brake temperature prior to braking: 80° C.

Braking deceleration: 0.7 G

Number of measurements: 8

EXAMPLES

Hereinafter, the present invention will be described in detail with reference to Examples, but the present invention is not limited to the following Examples as long as the gist thereof is not deviated. A complex oxide powder, a friction material composition, and a friction material in each of Examples and Comparative Examples contain 1.3 to 2.5% by mass of hafnium oxide as inevitable impurities with respect to zirconium oxide (calculated by the following formula (Z)).

([Mass of hafnium oxide]/([mass of zirconium oxide]+[mass of hafnium oxide]))×100(%) <Formula (Z)>

Example 1

Preparation of Complex Oxide Powder

High-purity cerium oxide (purity: 99.9%, manufactured by Mitsuwa Chemicals Co., Ltd.), high-purity zirconium oxide (purity: 99.9%, manufactured by Daiichi Kigenso Kagaku Kogyo Co., Ltd.), and high-purity aluminum oxide (purity: 98.0%, manufactured by Nippon Light Metal Company, Ltd.) were mixed so as to be uniform according to a blending ratio shown in Table 1.

Next, the mixture was melted at 2400° C. or higher by applying electric power of 2.0 kwh/kg in terms of electric power consumption using an arc type electric furnace for 2 hours. In order to facilitate the initial energization, 300 g of coke was used. After the completion of melting, the electric furnace was covered with a carbon lid, and the melted mixture was slowly cooled in air for 24 hours to obtain an ingot. The obtained ingot was pulverized to a particle size (diameter) of 3 mm or less with a jaw crusher and a roll crusher, and then sieved to collect a powder of 1 mm or less.

In order to remove suboxides generated in the melting step or strains generated in crystals due to supercooling, the collected powder was heat-treated. The heat treatment was performed at 600° C. for 3 hours in air using an electric furnace. Thereafter, the heat-treated product was pulverized with a planetary mill (manufactured by Fritsch Japan Co., Ltd, apparatus name: PULVERISETTE 6) for 15 minutes.

Specifically, the pulverization was performed under the following condition.

<Dry Pulverization Condition>

Pulverizer: planetary ball mill $ZrO_2$ pot: 500 cc $ZrO_2$ beads (φ5 mm): 900 g Number of rotations: 400 rpm Pulverizing time: 15 min As described above, a complex oxide powder according to Example 1 was obtained.

Preparation of Friction Material Composition

Respective materials were mixed so as to be uniform according to a blending ratio shown in Table 2 to obtain a friction material composition according to Example 1. For mixing, an Eirich intensive mixer manufactured by Nippon Eirich Co., Ltd. was used.

<Manufacturing of Friction Material and Brake Pad>

The obtained friction material composition was preformed with a preform machine. The obtained preformed product was thermoformed together with an iron back plate. As thermoforming conditions, a friction surface was set at 155° C., a B/P side was set at 160° C., a middle die was set at 140° C., and a molding pressure was set at 500 kg/cm$^2$. Degassing was performed on a friction surface 8 times (300 seconds in total) and on a B/P side 10 seconds 8 times. A thermoforming press (product name: MA250, manufactured by MARUSHICHI ENGINEERING CO., LTD) was used for thermoforming.

Next, the obtained molded product was heat-treated. As heat treatment conditions, a temperature of 250° C., a pressure of 5 kg/cm$^2$, and a time of 5 hours were set. As described above, a laminate including the back plate and a molded body (friction material) composed of the friction material composition was obtained.

Using a rotary polishing machine, the obtained laminate including the back plate and the friction material was polished, subsequently subjected to a scorching treatment at 500° C., and further subjected to slotting to obtain a brake pad according to Example 1.

Examples 2 to 29

<Manufacturing of Complex Oxide Powder, Friction Material Composition, Friction Material, and Brake Pad>

A complex oxide powder, a friction material composition, a friction material, and a brake pad according to Examples 2 to 29 were obtained in the same manner as in Example 1 except that the mixing ratio of a starting material was changed to a blending ratio shown in Table 1.

$Y_2O_3$ shown in Table 1 is high-purity yttrium oxide (purity: 99.99%, manufactured by Wako Pure Chemical Industries, Ltd.), $La_2O_3$ is high-purity lanthanum oxide (purity: 99.9%, manufactured by Wako Pure Chemical Industries, Ltd.), CaO is high-purity calcium oxide (purity: 99.0%, manufactured by Wako Pure Chemical Industries, Ltd.), MgO is high-purity magnesium oxide (purity: 97.0%, manufactured by KISHIDA CHEMICAL CO., LTD.), $SiO_2$ is high-purity silica (purity: 99.0%, primary, manufactured by KISHIDA CHEMICAL CO., LTD.); and $TiO_2$ is high-purity titanium oxide (purity: 99.5%, manufactured by KISHIDA CHEMICAL CO., LTD.).

Comparative Example 1 and Comparative Example 2

<Manufacturing of Complex Oxide Powder, Friction Material Composition, Friction Material, and Brake Pad>

A complex oxide powder, a friction material composition, a friction material, and a brake pad according to Comparative Example 1 and Comparative Example 2 were obtained in the same manner as in Example 1 except that the blending ratio of high-purity cerium oxide, high-purity zirconium oxide, and high-purity aluminum oxide was changed to a blending ratio shown in Table 1.

TABLE 1

| | $CeO_2$ (% by mass) | $ZrO_2$ (% by mass) | $Al_2O_3$ (% by mass) | $Y_2O_3$ (% by mass) | $La_2O_3$ (% by mass) | CaO (% by mass) | MgO (% by mass) | $SiO_2$ (% by mass) | $TiO_2$ (% by mass) | Total (% by mass) |
|---|---|---|---|---|---|---|---|---|---|---|
| Example 1 | 68.0 | 27.0 | 5.0 | — | — | — | — | — | — | 100.0 |
| Example 2 | 72.3 | 22.6 | 5.1 | — | — | — | — | — | — | 100.0 |
| Example 3 | 89.8 | 9.0 | 1.2 | — | — | — | — | — | — | 100.0 |
| Example 4 | 87.5 | 8.0 | 4.5 | — | — | — | — | — | — | 100.0 |
| Example 5 | 90.6 | 4.4 | 5.0 | — | — | — | — | — | — | 100.0 |
| Example 6 | 85.0 | 10.0 | 3.0 | 2.0 | — | — | — | — | — | 100.0 |
| Example 7 | 85.0 | 10.0 | 3.0 | — | 2.0 | — | — | — | — | 100.0 |
| Example 8 | 85.0 | 10.0 | 3.0 | — | — | 2.0 | — | — | — | 100.0 |
| Example 9 | 85.0 | 10.0 | 3.0 | 1.0 | — | 1.0 | — | — | — | 100.0 |
| Example 10 | 87.5 | 8.0 | 4.5 | — | — | — | — | — | — | 100.0 |
| Example 11 | 68.5 | 30.0 | 1.5 | — | — | — | — | — | — | 100.0 |
| Example 12 | 56.5 | 42.0 | 1.5 | — | — | — | — | — | — | 100.0 |
| Example 13 | 56.9 | 43.0 | 0.1 | — | — | — | — | — | — | 100.0 |
| Example 14 | 49.5 | 49.0 | 1.5 | — | — | — | — | — | — | 100.0 |
| Example 15 | 77.0 | 21.5 | 1.5 | — | — | — | — | — | — | 100.0 |
| Example 16 | 62.5 | 10.5 | 1.5 | 25.5 | — | — | — | — | — | 100.0 |
| Example 17 | 40.9 | 28.4 | 1.5 | — | — | 29.2 | — | — | — | 100.0 |
| Example 18 | 43.3 | 29.7 | 1.4 | — | 25.6 | — | — | — | — | 100.0 |
| Example 19 | 53.7 | 30.2 | 0.9 | — | — | — | — | 15.2 | — | 100.0 |
| Example 20 | 92.0 | 4.5 | 1.5 | — | — | — | — | 2.0 | — | 100.0 |
| Example 21 | 53.8 | 19.6 | 1.6 | — | — | — | — | — | 25.0 | 100.0 |
| Example 22 | 83.5 | 11.2 | 0.8 | — | — | — | — | — | 4.5 | 100.0 |
| Example 23 | 63.9 | 30.4 | 1.4 | — | — | — | 4.3 | — | — | 100.0 |
| Example 24 | 69.5 | 0.5 | 1.5 | — | — | — | 28.5 | — | — | 100.0 |
| Example 25 | 76.3 | 0.1 | 23.6 | — | — | — | — | — | — | 100.0 |
| Example 26 | 54.0 | 5.0 | 1.5 | — | 39.5 | — | — | — | — | 100.0 |
| Example 27 | 54.0 | 5.0 | 1.5 | — | — | 39.5 | — | — | — | 100.0 |
| Example 28 | 58.9 | 0.1 | 1.5 | — | — | — | 39.5 | — | — | 100.0 |

TABLE 1-continued

| | $CeO_2$ (% by mass) | $ZrO_2$ (% by mass) | $Al_2O_3$ (% by mass) | $Y_2O_3$ (% by mass) | $La_2O_3$ (% by mass) | CaO (% by mass) | MgO (% by mass) | $SiO_2$ (% by mass) | $TiO_2$ (% by mass) | Total (% by mass) |
|---|---|---|---|---|---|---|---|---|---|---|
| Example 29 | 95.3 | — | 4.7 | — | — | — | — | — | — | 100.0 |
| Comparative Example 1 | 90.0 | 10.0 | — | — | — | — | — | — | — | 100.0 |
| Comparative Example 2 | 100.0 | — | — | — | — | — | — | — | — | 100.0 |

TABLE 2

| | | | Mass (%) |
|---|---|---|---|
| Friction modifier | Inorganic filler | Complex oxide powder (examples and comparative examples) | 11.0 |
| | | Calcium silicate | 16.0 |
| | | $BaSO_4$ | |
| | | Mica | |
| | | Calcium hydroxide | |
| | | $Fe_3O_4$ | 15.0 |
| | | Graphite | 9.0 |
| | | SnS | |
| | | PTFE | 1.0 |
| | Organic filler | Cashew dust | 4.0 |
| | | Rubber dust | 2.0 |
| Fiber base material | | Copper | 4.0 |
| | | Aramid | 30.0 |
| | | Potassium titanate | |
| | | Ceramics (biologically soluble fiber) | |
| Binder | | Phenol resin | 8.0 |
| | | Total | 100.0 |

Measurement of Composition of Complex Oxide Powder

The composition (in terms of oxide) of the complex oxide powder manufactured in each of Examples and Comparative Examples was analyzed using ICP-AES ("ULTIMA-2", manufactured by HORIBA Ltd.). As a result, the blending ratios could be confirmed to be as shown in Table 1.

Measurement of Specific Surface Area of Complex Oxide Powder

The specific surface area of the complex oxide powder of each of Examples and Comparative Examples was measured by the BET method using a specific surface area meter ("Macsorb", manufactured by Mountec Co. Ltd.). The results are shown in Table 3.

Measurement of Crystallite Diameter of Complex Oxide Powder

The X-ray diffraction spectrum of the complex oxide powder of each of Examples and Comparative Examples was obtained using an X-ray diffractometer ("RINT2500", manufactured by Rigaku Corporation). The measurement conditions were set as follows.

<Measurement Conditions>

Measuring apparatus: X-ray diffractometer (RINT2500, manufactured by Rigaku Corporation)
Radiation source: CuKα radiation source
Sampling interval: 0.02°
Scanning speed: 2θ=1.0°/min
Divergence slit (DS): 1°
Divergence vertical limit slit: 5 mm
Scatter slit (SS): 1°
Receiving slit (RS): 0.3 mm
Monochrome receiving slit: 0.8 mm
Tube voltage: 50 kV
Tube current: 300 mA Thereafter, the measurement result of a peak appearing at 2θ of 40° to 42° in XRD measurement was applied to the following Scherrer formula to calculate a crystallite diameter.

$$Dp=(K\times\lambda)/\beta\cos\theta$$

Here, Dp is the crystallite diameter of the complex oxide powder; λ is the wavelength of X-rays; θ is a diffraction angle; K is a constant referred to as a shape factor; and β is a peak width after the spreading of a diffraction line according to an apparatus is corrected.

The peak at 2θ of 40° to 42° is a peak derived from (111) of $CeAlO_3$.

The results are shown in Table 3.

For reference, the X-ray diffraction spectrum of the complex oxide powder according to Example 4 was shown in FIG. 1.

Measurement of Particle Diameter $D_{50}$, Particle Diameter $D_{90}$, and Particle Diameter $D_{99}$ of Complex Oxide Powder The particle diameter of the complex oxide powder of each of Examples and Comparative Examples was measured using a laser diffraction/scattering particle diameter distribution measuring apparatus "LA-950" (manufactured by HORIBA, Ltd.). More specifically, the particle diameter was measured in a state where 0.15 g of a sample and 40 ml of a 0.2% sodium hexametaphosphate aqueous solution were placed in a 50-ml beaker, followed by placing the dispersed product in an apparatus (laser diffraction/scattering particle diameter distribution measuring apparatus ("LA-950").

The measurement conditions were set as follows. The results are shown in Table 3.

Dispersion condition: ultrasonic dispersion at 100 W for 2 minutes
Refractive index: 1.70 to 0.0 i

Measurement of Grain Crushing Strength of Complex Oxide Powder

The grain crushing strength of the complex oxide powder of each of Examples and Comparative Examples was measured using particles before being pulverized with a planetary mill (particles before being pulverized with a planetary mill to obtain the complex oxide powder of each of Examples and Comparative Examples). As the particles before being pulverized, particles having a particle diameter of 2.36 mm to 2.80 mm were used. The particles having the particle diameter were obtained using a commercially available sieve. The number of the particles to be measured was 50, and the average value thereof was taken as the grain crushing strength. A tensile compression tester was used as a measuring apparatus. Specifically, SV-201-NSL manufactured by Imada Seisakusho Co., Ltd. was used as the tensile compression tester. A load speed was 0.5 mm/min. The results are shown in Table 3.

Measurement of True Specific Gravity of Complex Oxide Powder

The true specific gravity of the complex oxide powder of each of Examples and Comparative Examples was measured in accordance with JIS Z8807:2012. The results are shown in Table 3.

TABLE 3

| | SA ($m^2/g$) | Crystallite diameter (nm) near 42° | $D_{99}$ (μm) | $D_{90}$ (μm) | $D_{50}$ (μm) | Grain crushing strength (N) | True specific gravity ($g/cm^2$) |
|---|---|---|---|---|---|---|---|
| Example 1 | 2.6 | 47.8 | 11.8 | 7.0 | 2.8 | 146 | 6.7 |
| Example 2 | 2.1 | 45.8 | 12.3 | 7.5 | 3.2 | 135 | 6.7 |
| Example 3 | 2.6 | 38.8 | 12.2 | 7.5 | 3.0 | 124 | 7.0 |
| Example 4 | 2.7 | 44.1 | 11.4 | 7.1 | 2.8 | 123 | 6.9 |
| Example 5 | 2.7 | 40.1 | 12.7 | 7.9 | 3.1 | 162 | 6.8 |
| Example 6 | 2.5 | 45.8 | 11.1 | 6.9 | 2.9 | 143 | 6.8 |
| Example 7 | 2.6 | 47.2 | 11.8 | 6.9 | 2.8 | 135 | 6.8 |
| Example 8 | 2.5 | 46.8 | 11.5 | 7.0 | 2.7 | 141 | 6.7 |
| Example 9 | 2.7 | 44.9 | 13.1 | 7.5 | 3.2 | 135 | 6.8 |
| Example 10 | 1.1 | 44.5 | 47.7 | 20.9 | 10.3 | 122 | 6.9 |
| Example 11 | 2.5 | 49.8 | 12.5 | 7.4 | 3.1 | 175 | 6.7 |
| Example 12 | 2.2 | 48.5 | 12.5 | 7.9 | 3.3 | 171 | 6.7 |
| Example 13 | 3.2 | 49.0 | 13.5 | 8.2 | 3.6 | 168 | 6.7 |
| Example 14 | 2.2 | 46.6 | 12.9 | 7.5 | 3.0 | 165 | 6.7 |
| Example 15 | 9.8 | 45.4 | 4.7 | 1.7 | 0.5 | 166 | 6.7 |
| Example 16 | 2.7 | 37.0 | 12.5 | 7.4 | 3.2 | 155 | 6.2 |
| Example 17 | 2.7 | 20.1 | 12.5 | 7.8 | 2.8 | 97 | 5.4 |
| Example 18 | 2.1 | 25.2 | 13.3 | 8.2 | 4.1 | 132 | 6.4 |
| Example 19 | 4.4 | 12.1 | 12.7 | 7.8 | 3.5 | 125 | 5.8 |
| Example 20 | 3.1 | 38.6 | 13.3 | 8.2 | 2.8 | 155 | 6.7 |
| Example 21 | 3.8 | 20.5 | 12.8 | 8.9 | 3.5 | 144 | 6.0 |
| Example 22 | 2.9 | 10.8 | 11.2 | 6.8 | 2.5 | 175 | 6.6 |
| Example 23 | 1.9 | 38.2 | 15.5 | 11.3 | 4.0 | 175 | 6.3 |
| Example 24 | 1.5 | 10.5 | 14.7 | 8.1 | 4.5 | 99 | 5.9 |
| Example 25 | 1.6 | 41.4 | 9.4 | 6.4 | 3.5 | 157 | 6.2 |
| Example 26 | 3.5 | 45.4 | 11.2 | 6.5 | 3.3 | 126 | 6.8 |
| Example 27 | 2.8 | 42.1 | 10.9 | 6.1 | 3.1 | 139 | 6.3 |
| Example 28 | 1.9 | 39.9 | 13.2 | 6.1 | 3.5 | 146 | 6.3 |
| Example 29 | 3.0 | — | 12.6 | 8.0 | 3.7 | 157 | 6.7 |
| Comparative Example 1 | 2.6 | — | 10.6 | 6.63 | 2.8 | 115 | 7.1 |
| Comparative Example 2 | 1.0 | — | 49.1 | 23.0 | 9.2 | 51 | 6.8 |

Measurement of Lapping μ Value 200 friction coefficients were obtained under the following measurement conditions B in accordance with the Japanese Automobile Standard Organization JASO C406. The average value of the 200 friction coefficients was obtained. This was taken as a lapping μ value. The results are shown in Table 4.

<Measurement Condition B>

Braking initial speed: 65 km/h

Brake temperature prior to braking: 120° C.

Braking deceleration: 0.35 G

Number of measurements: 200

For each of the 200 measurements, those unused for other tests after production were used.

Evaluation of Friction Stability

A second effectiveness test was performed under the following measurement conditions C in accordance with the Japanese Automobile Standard Organization JASO C406, and an average value of friction coefficients measured 8 times was obtained as a friction coefficient X.

The second effectiveness test was performed under the following measurement conditions D in accordance with the Japanese Automobile Standard Organization JASO C406, and an average value of friction coefficients measured 8 times was obtained as a friction coefficient Y.

Thereafter, the difference between the friction coefficients [(friction coefficient X)−(friction coefficient Y)] was obtained.

The results are shown in Table 4.

<Measurement Condition C>

Braking initial speed: 100 km/h

Brake temperature prior to braking: 80° C.

Braking deceleration: 0.2 G

Number of measurements: 8

<Measurement Condition D>

Braking initial speed: 100 km/h

Brake temperature prior to braking: 80° C.

Braking deceleration: 0.7 G

Number of measurements: 8

For each of the 8 measurements, those unused for other tests after production were used.

Evaluation of Fade Resistance

A first fade test is performed under the following measurement conditions A in accordance with the Japanese Automobile Standard Organization JASO C406, to obtain 9 friction coefficients. Table 4 shows the largest friction coefficient value, the smallest friction coefficient value, and a difference between the largest friction coefficient value and the smallest friction coefficient value therein.

<Measurement Condition A>

Braking initial speed: 100 km/h

Braking interval: 35 seconds

Brake temperature prior to braking during first measurement: 80° C.

Braking deceleration: 0.45 G

Braking frequency: 9

Evaluation of Wear Resistance of Rotor

All the items were tested under the conditions of brake general performance test items (based on JASO-C406), and the average value of the wear amounts of a rotor on the inner and outer sides of the rotor was then obtained. As the wear amount of the rotor is smaller, the performance is better.

TABLE 4

| | | Evaluation of friction stability | | | Evaluation of fade resistance | |
|---|---|---|---|---|---|---|
| | Lapping μ value | Friction coefficient X 0.2G | Friction coefficient Y 0.7G | Difference between friction coefficients [(friction coefficient X) − (friction coefficient Y)] | Friction coefficient (average value) | Rotor wear μm |
| Example 1 | 0.45 | 0.47 | 0.42 | 0.05 | 0.27 | 6.8 |
| Example 2 | 0.46 | 0.47 | 0.43 | 0.04 | 0.28 | 6.6 |
| Example 3 | 0.43 | 0.48 | 0.38 | 0.10 | 0.25 | 1.4 |
| Example 4 | 0.43 | 0.47 | 0.43 | 0.04 | 0.29 | 6.7 |
| Example 5 | 0.44 | 0.46 | 0.40 | 0.06 | 0.27 | 6.8 |
| Example 6 | 0.44 | 0.47 | 0.42 | 0.05 | 0.27 | 5.0 |
| Example 7 | 0.42 | 0.45 | 0.40 | 0.05 | 0.28 | 6.9 |
| Example 8 | 0.41 | 0.44 | 0.39 | 0.05 | 0.25 | 4.4 |
| Example 9 | 0.43 | 0.45 | 0.38 | 0.07 | 0.25 | 3.9 |
| Example 10 | 0.50 | 0.50 | 0.46 | 0.04 | 0.26 | 9.3 |
| Example 11 | 0.41 | 0.44 | 0.37 | 0.07 | 0.26 | 4.3 |
| Example 12 | 0.42 | 0.43 | 0.37 | 0.06 | 0.26 | 4.3 |
| Example 13 | 0.40 | 0.42 | 0.35 | 0.08 | 0.25 | 3.7 |
| Example 14 | 0.42 | 0.43 | 0.37 | 0.06 | 0.26 | 4.3 |
| Example 15 | 0.40 | 0.43 | 0.36 | 0.08 | 0.27 | 2.2 |
| Example 16 | 0.41 | 0.43 | 0.36 | 0.07 | 0.27 | 6.8 |
| Example 17 | 0.40 | 0.41 | 0.35 | 0.06 | 0.26 | 4.4 |
| Example 18 | 0.40 | 0.42 | 0.35 | 0.07 | 0.24 | 5.8 |
| Example 19 | 0.42 | 0.43 | 0.36 | 0.07 | 0.25 | 6.1 |
| Example 20 | 0.42 | 0.42 | 0.34 | 0.08 | 0.26 | 4.5 |
| Example 21 | 0.41 | 0.42 | 0.35 | 0.07 | 0.25 | 3.8 |
| Example 22 | 0.40 | 0.42 | 0.34 | 0.08 | 0.25 | 4.3 |
| Example 23 | 0.43 | 0.45 | 0.40 | 0.05 | 0.27 | 6.7 |
| Example 24 | 0.40 | 0.41 | 0.35 | 0.06 | 0.25 | 5.5 |
| Example 25 | 0.45 | 0.47 | 0.45 | 0.02 | 0.25 | 15.6 |
| Example 26 | 0.41 | 0.42 | 0.37 | 0.05 | 0.25 | 4.4 |
| Example 27 | 0.41 | 0.42 | 0.37 | 0.05 | 0.25 | 4.5 |
| Example 28 | 0.40 | 0.41 | 0.36 | 0.05 | 0.25 | 4.6 |
| Example 29 | 0.39 | 0.45 | 0.41 | 0.04 | 0.28 | 0.1 |
| Comparative Example 1 | 0.35 | 0.41 | 0.33 | 0.08 | 0.27 | 4.5 |
| Comparative Example 2 | 0.36 | 0.39 | 0.30 | 0.09 | 0.25 | 1.9 |

The invention claimed is:

1. A cerium-based complex oxide powder comprising cerium and aluminum, and having a specific surface area of 0.5 m2/g or more and 10 m2/g or less, wherein the cerium-based complex oxide powder has a crystallite diameter of 10 nm or more and 80 nm or less.

2. The cerium-based complex oxide powder according to claim 1, wherein the cerium-based complex oxide powder comprises zirconium.

3. The cerium-based complex oxide powder according to claim 1, wherein the cerium-based complex oxide powder has a particle diameter D50 of 0.5 μm or more and 20 μm or less.

4. The cerium-based complex oxide powder according to claim 1, wherein the cerium-based complex oxide powder has a particle diameter D99 of 60 μm or less.

5. The cerium-based complex oxide powder according to claim 1, wherein the cerium-based complex oxide powder has a grain crushing strength of 50 N or more and 300 N or less.

6. The cerium-based complex oxide powder according to claim 1, wherein:

a content of cerium is 40% by mass or more and 95% by mass or less in terms of oxide;

a content of zirconium is 0.1% by mass or more and 50% by mass or less in terms of oxide; and a content of aluminum is 0.1% by mass or more and 24% by mass or less in terms of oxide.

7. The cerium-based complex oxide powder according to claim 6, wherein a content of aluminum is 0.1% by mass or more and 10% by mass or less in terms of oxide.

8. The cerium-based complex oxide powder according to claim 6, wherein:

a content of zirconium is 0.1% by mass or more and 40% by mass or less in terms of oxide; and a content of aluminum is 0.1% by mass or more and 10% by mass or less in terms of oxide.

9. The cerium-based complex oxide powder according to claim 1, wherein:

a content of cerium is 49% by mass or more and 91% by mass or less in terms of oxide;

a content of zirconium is 1% by mass or more and 43% by mass or less in terms of oxide; and a content of aluminum is 1% by mass or more and 8% by mass or less in terms of oxide.

10. The cerium-based complex oxide powder according to claim 1, wherein a total content of cerium, zirconium, and aluminum is 60% by mass or more in terms of oxide.

11. The cerium-based complex oxide powder according to claim 1, wherein the cerium-based complex oxide powder comprises $CeAlO_3$.

12. The cerium-based complex oxide powder according to claim 1, wherein the cerium-based complex oxide powder comprises a rare earth element other than cerium.

13. The cerium-based complex oxide powder according to claim 1, wherein the cerium-based complex oxide powder comprises a rare earth element other than cerium within a range of 0.1% by mass or more and 40% by mass or less in terms of oxide.

14. The cerium-based complex oxide powder according to claim 12, wherein the rare earth element other than cerium is one or more selected from the group consisting of yttrium and lanthanum.

15. The cerium-based complex oxide powder according to claim 1, wherein the cerium-based complex oxide powder comprises an alkaline earth element.

16. The cerium-based complex oxide powder according to claim 1, wherein the cerium-based complex oxide powder is for a friction material.

17. A friction material composition comprising a friction modifier, a fiber base material, and a binder, wherein the friction material composition comprises the cerium-based complex oxide powder according to claim 1 as the friction modifier.

18. The friction material composition according to claim 17, wherein a content of the cerium-based complex oxide powder is 5% by mass or more and 20% by mass or less when a total of the friction material composition is 100% by mass.

19. A friction material comprising a molded body composed of the friction material composition according to claim 17.

20. The friction material according to claim 19, wherein: a first fade test measured under the following measurement condition A is performed 9 times in accordance with the Japanese Automobile Standard Organization JASO C406; and an average value of a maximum value μ value and a minimum friction coefficient is indicated is calculated in an obtained behavior peak, and the average value is 0.20μ or more.

<Measurement condition A>

Braking initial speed: 100 km/h

Braking interval: 35 seconds

Brake temperature prior to braking during first measurement: 80° C.

Braking deceleration: 0.45 G

Braking frequency: 9.

21. The friction material according to claim 19, wherein a lapping μ value, which is an average value of friction coefficients measured under the following measurement condition B in accordance with the Japanese Automobile Standard Organization JASO C406, is 0.39 or more <Measurement condition B>

Braking initial speed: 65 km/h

Brake temperature prior to braking: 120° C.

Braking deceleration: 0.35 G

Number of measurements: 200.

22. The friction material according to claim 19, wherein, when a friction material coefficient X is an average value of friction coefficients measured 8 times in a second effectiveness test under the following measurement condition C in accordance with the Japanese Automobile Standard Organization JASO C406, and a friction coefficient Y is an average value of friction coefficients measured 8 times in the second effectiveness test under the following measurement condition D in accordance with the Japanese Automobile Standard Organization JASO C406, a difference between the friction coefficients [(friction coefficient X)−(friction coefficient Y)] is 0.12 or less <Measurement condition C>

Braking initial speed: 100 km/h

Brake temperature prior to braking: 80° C.

Braking deceleration: 0.2 G

Number of measurements: 8

<Measurement condition D>

Braking initial speed: 100 km/h

Brake temperature prior to braking: 80° C.

Braking deceleration: 0.7 G

Number of measurements: 8.

* * * * *